(12) United States Patent
Pais

(10) Patent No.: US 10,144,532 B2
(45) Date of Patent: Dec. 4, 2018

(54) CRAFT USING AN INERTIAL MASS REDUCTION DEVICE

(71) Applicant: Salvatore Cezar Pais, Leonardtown, MD (US)

(72) Inventor: Salvatore Cezar Pais, Leonardtown, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 153 days.

(21) Appl. No.: 15/141,270

(22) Filed: Apr. 28, 2016

(65) Prior Publication Data

US 2017/0313446 A1    Nov. 2, 2017

(51) Int. Cl.
    *B64G 1/40*    (2006.01)

(52) U.S. Cl.
    CPC .................................. *B64G 1/409* (2013.01)

(58) Field of Classification Search
    CPC ...................................................... B64G 1/409
    See application file for complete search history.

(56) References Cited

PUBLICATIONS

Froning, H. David, Quantum Vacuum Engineering for Power and Propulsion from the Energetics of Space, Third International Conference on Future Energy, Oct. 9-10, 2009, Washington, DC, US.
Pais, Salvatore, Conditional Possibility of Spacecraft Propulsion at Superluminal Speeds, Intl. J. Space Science and Engineering, 2015, vol. 3, No. 1, Inderscience Enterprises Ltd.
Puthoff, H.E., Polarizable-Vacuum (PV) Approach to General Relativity, Foundations of Physics, Jun. 2002, vol. 32, No. 6.
Prigogine, Ilya, Time, Structure and Fluctuations, Nobel Lecture, Dec. 8, 1977, Brussels, Belgium and Austin, Texas.
Hayasaka, Hideo and Takeuchi, Sakae, Anomalous Weight Reduction on a Gyroscope's Right Rotations around the Vertical Axis on the Earth, The American Physical Society, Physical Review Letters, Dec. 18, 1989, vol. 63, No. 25, Japan.
Pais, Salvatore, The High Energy Electromagnetic Field Generator, Int. J. Space Science and Engineering, 2015, vol. 3, No. 4, Inderscience Enterprises, Ltd.

*Primary Examiner* — Philip J Bonzell
(74) *Attorney, Agent, or Firm* — Mark O Glut; NAWCAD

(57) ABSTRACT

A craft using an inertial mass reduction device comprises of an inner resonant cavity wall, an outer resonant cavity, and microwave emitters. The electrically charged outer resonant cavity wall and the electrically insulated inner resonant cavity wall form a resonant cavity. The microwave emitters create high frequency electromagnetic waves throughout the resonant cavity causing the resonant cavity to vibrate in an accelerated mode and create a local polarized vacuum outside the outer resonant cavity wall.

4 Claims, 1 Drawing Sheet

CRAFT USING AN INERTIAL MASS REDUCTION DEVICE

STATEMENT OF GOVERNMENT INTEREST

Figure 1:
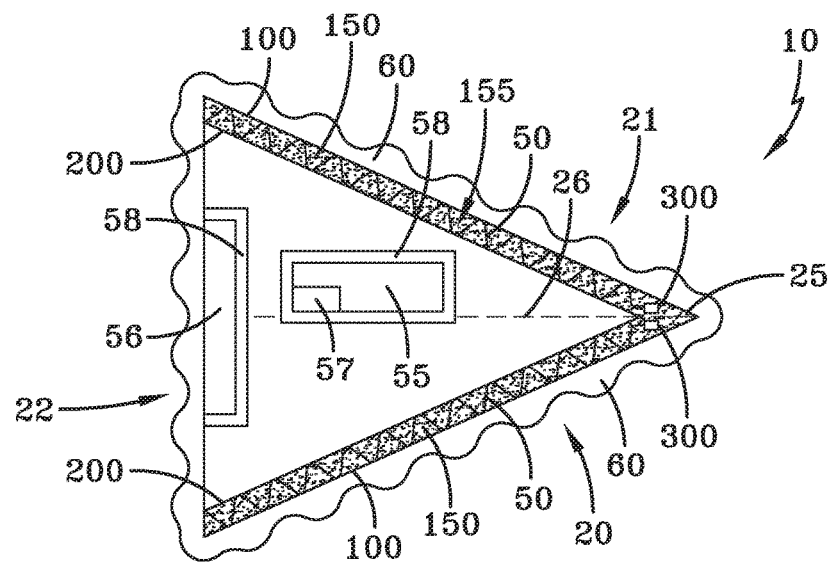

The invention described herein may be manufactured and used by or for the Government of the United States of America for governmental purposes without payment of any royalties thereon or therefor.

BACKGROUND

There are four known fundamental forces which control matter and, therefore, control energy. The four known forces are strong nuclear forces, weak nuclear forces, electromagnetic force, and gravitational force. In this hierarchy of forces, the electromagnetic force is perfectly positioned to be able to manipulate the other three. A stationary electric charge gives rise to an electric (electrostatic) field, while a moving charge generates both an electric and a magnetic field (hence the electromagnetic field). Additionally, an accelerating charge induces electromagnetic radiation in the form of transverse waves, namely light. Mathematically, as well as physically, electromagnetic field intensity can be represented as the product of electric field strength and magnetic field strength. Electromagnetic fields act as carriers for both energy and momentum, thus interacting with physical entities at the most fundamental level.

Artificially generated high energy electromagnetic fields, such as those generated with a high energy electromagnetic field generator (HEEMFG), interact strongly with the vacuum energy state. The vacuum energy state can be described as an aggregate/collective state, comprised of the superposition of all quantum fields' fluctuations permeating the entire fabric of spacetime. High energy interaction with the vacuum energy state can give rise to emergent physical phenomena, such as force and matter fields' unification. According to quantum field theory, this strong interaction between the fields is based on the mechanism of transfer of vibrational energy between the fields. The transfer of vibrational energy further induces local fluctuations in adjacent quantum fields which permeate spacetime (these fields may or may not be electromagnetic in nature). Matter, energy, and spacetime are all emergent constructs which arise out of the fundamental framework that is the vacuum energy state.

Everything that surrounds us, ourselves included, can be described as macroscopic collections of fluctuations, vibrations, and oscillations in quantum mechanical fields. Matter is confined energy, bound within fields, frozen in a quantum of time. Therefore, under certain conditions (such as the coupling of hyper-frequency axial spin with hyper-frequency vibrations of electrically charged systems) the rules and special effects of quantum field behavior also apply to macroscopic physical entities (macroscopic quantum phenomena).

Moreover, the coupling of hyper-frequency gyrational (axial rotation) and hyper-frequency vibrational electrodynamics is conducive to a possible physical breakthrough in the utilization of the macroscopic quantum fluctuations vacuum plasma field (quantum vacuum plasma) as an energy source (or sink), which is an induced physical phenomenon.

The quantum vacuum plasma (QVP) is the electric glue of our plasma universe. The Casimir Effect, the Lamb Shift, and Spontaneous Emission, are specific confirmations of the existence of QVP.

It is important to note that in region(s) where the electromagnetic fields are strongest, the more potent the interactions with the QVP, therefore, the higher the induced energy density of QVP particles which spring into existence (the Dirac Sea of electrons and positrons). These QVP particles may augment the obtained energy levels of the HEEMFG system, in that energy flux amplification may be induced.

It is possible to reduce the inertial mass and hence the gravitational mass, of a system/object in motion, by an abrupt perturbation of the non-linear background of local spacetime (the local vacuum energy state), equivalent to an accelerated excursion far from thermodynamic equilibrium (analogous with symmetry-breaking induced by abrupt changes of state/phase transitions). The physical mechanism which drives this diminution in inertial mass is based on the negative pressure (hence repulsive gravity) exhibited by the polarized local vacuum energy state (local vacuum polarization being achieved by a coupling of accelerated high frequency vibration with accelerated high frequency axial rotation of an electrically charged system/object) in the close proximity of the system/object in question. In other words, inertial mass reduction can be achieved via manipulation of quantum field fluctuations in the local vacuum energy state, in the immediate proximity of the object/system. Therefore it is possible to reduce a craft's inertia, that is, its resistance to motion/acceleration by polarizing the vacuum in the close proximity of the moving craft.

Polarization of the local vacuum is analogous to manipulation/modification of the local space tie topological lattice energy density. As a result, extreme speeds can be achieved.

If we can engineer the structure of the local quantum vacuum state, we can engineer the fabric of our reality at the most fundamental level (thus affecting a physical system's inertial and gravitational properties). This realization would greatly advance the fields of aerospace propulsion and power generation.

The physical equation which describes the maximum intensity achieved by the high energy electromagnetic field generator (HEEMFG) system is described by the magnitude of the Poynting vector, which in non-relativistic for (accounting for all three modes of motion) can be written as:

$$S_{max} = f_G(\sigma^2/\varepsilon_0)\,[R_r\omega + R_v v + v_R] \quad \text{(Equation 1)},$$

where $f_G$ is the HEEMFG system geometric shape factor (equal to 1 for a disc configuration), $\sigma$ is the surface charge density (total electric charge divided by surface area of the HEEMFG system), $\varepsilon_0$ is the electrical permittivity of free space, $R_r$ is the radius of rotation (disc radius), $\omega$ is the angular frequency of rotation in rad/s, $R_v$ is the vibration (harmonic oscillation) amplitude, v is the angular frequency of vibration in Hertz, and the term $v_R$ is the curvilinear translation speed (acquired via a propulsive unit of either chemical, nuclear or magneto-plasma-dynamic (VASIMR) type attached to the HEEMFG system—the integrated unit being the craft).

Therefore, if we consider only rotation, given a disc configuration, with $\sigma=50{,}000$ Coulombs/m$^2$, a disc (spinning/axially rotating) radius of 2 m and an angular speed of 30,000 RPM, an generate an electromagnetic (EM) field intensity ($S_{max}$ is the rate of energy flow per unit area, or energy flux) value on the order of $10^{24}$ Watts/m$^2$ (this value does not account for any QVP interactions).

Furthermore, if we couple the high frequency of rotation with high vibration (harmonic oscillation) frequencies in the range of $10^9$ to $10^{18}$ Hertz (and above) we can obtain $S_{max}$ intensity values in the range $10^{24}$ to $10^{28}$ Watts/m$^2$ (and beyond). These extremely high EM field intensity values emphasize the novelty of this concept, especially suited for the design of energy generation machinery with power output levels much higher than those currently achievable.

For the case of an accelerating angular frequency of vibration ($a_{max}=R_v v^2$), neglecting rotation and curvilinear translation, Equation 1 becomes (note intrinsic significance of acceleration):

$$S_{max}=f_G(\sigma^2/\varepsilon_0)\,[(R_v v^2)\,t_{op}] \quad \text{(Equation 2)},$$

where $t_{op}$ is the operational time for which the charged electrical system s accelerating in its vibration.

Close inspection of Equation 2 results in an important realization, namely: strong local interaction with the high energetics of the quantum vacuum fields' fluctuations superposition (macroscopic vacuum energy state) is possible in a laboratory environment, by application of high frequency gyration (axial spin) and/or high frequency vibration of minimally charged objects (order of unity surface charge density), in an acceleration mode. In this manner, a high degree of local vacuum energy polarization can be achieved.

To illustrate this fact, considering a high end microwave frequency on the order of $10^{11}$ Hertz, a surface charge density on the order of 1 C/m$^2$ and an operational time on the order of the inverse of the vibrational amplitude, we obtain an energy flux value of $10^{33}$ W/m$^2$. This exceptionally high power intensity induces a pair production avalanche, thereby ensuring complete polarization of the local vacuum state.

Local polarization of the vacuum in the close proximity of a craft equipped with an HEEMFG system would have the effect of cohering the highly energetic and random quantum vacuum fields' fluctuations, which virtually block the path of an accelerating craft, in such a manner that the resulting negative pressure of the polarized vacuum allows less labored motion through it (as noted by H. David Froning).

Spontaneous electron-positron pair production out of the vacuum is a strong indicator of vacuum polarization being achieved. Julian Schwinger (Nobel prize winning physicist) gives a value of the electric field (E) on the order of $10^{18}$ V/m, for this phenomenon to take place. The mass production rate $(dm/dt)_{pp}$ of particle/anti-particle pairs can be expressed in terms of $S_{max}$ (energy flux), namely:

$$2\gamma(dm/dt)_{pp}c^2=S_{max}A_S \quad \text{(Equation 3)},$$

where $A_S$ is the surface area from which the energy flux emanates, c is the speed of light in free space, and $\gamma$ is the relativistic stretch factor $[1-(v^2/c^2)]^{-1/2}$. Note that the pair production rate increases with increasing energy flux from the craft's generated electromagnetic field. Therefore, the level, to which the vacuum is polarized, thus allowing less labored motion through it, strictly depends on the artificially generated electromagnetic energy flux.

If we consider the boundary condition in the close proximity of the craft where the energy density of the artificially generated electromagnetic (EM) field equals the local energy density of the polarized vacuum (caused in part by the local zero-point vacuum fluctuations on the order of $10^{-15}$ Joules/cm$^3$ and in part by the artificial EM field interacting with the local vacuum energy state) we can write the approximate equivalence:

$$(S_{max}/c)=[(h^* v_v^4)/8\pi^2 c^3] \quad \text{(Equation 4)},$$

where c is the speed of light in free space, (h*) is Planck's constant divided by ($2\pi$) and ($v_v$) is the frequency of quantum fluctuations in the vacuum (modeled as harmonic oscillators). Furthermore, given that the left side of Equation 4 is on the order of ($\varepsilon_0 E^2$) where E is the artificially generated electric field (strength), considering the Schwinger value of (E) for the onset of spontaneous pair production, we obtain a ($v_v$) value on the order of $10^{22}$ Hertz, which matches our expectations, since the Dirac virtual pair production, results in total annihilation, yielding gamma rays, which occupy the electromagnetic frequency spectrum of $10^{19}$ Hertz and above.

A recent paper, by the inventor, published in the International Journal of Space Science and Engineering (Pais, S. C., Vol. 3, No. 1, 2015) considers the conditional possibility of superluminal craft propulsion in a Special Relativity framework. It is observed that under certain physical conditions, the singularity expressed by the relativistic stretch factor 'gamma' as the craft's speed (v) approaches the speed of light (c), is no longer present in the physical picture. This involves the instantaneous removal of energy-mass from the system (craft) when the craft's speed reaches (v=c/2). The author discusses the possibility of using exotic matter (negative mass/negative energy density) to bring about this effect. This may not have to be the only alternative. The artificial generation of gravity waves in the locality of the craft, can result in energy-mass removal (gravity waves are propagating fluctuations in gravitational fields, whose amplitude and frequency are a function of the motion of the masses involved).

Moreover, it is feasible to remove energy-mass from the system by enabling vacuum polarization, as discussed by Harold Puthoff; in that diminution of inertial (and thus gravitational) mass can be achieved via manipulation of quantum field fluctuations in the vacuum. In other words, it is possible to reduce a craft's inertia, that is, its resistance to motion/acceleration by polarizing the vacuum in the close proximity of the moving craft. As a result, extreme speeds can be achieved.

Vacuum energy state can be thought of as a chaotic system comprised of random, highly energetic fluctuations in the collective quantum fields which define it. Considering Ilya Prigogine's Nobel Prize work on far from equilibrium thermodynamics (the Prigogine effect), a chaotic system can self-organize if subjected to three conditions, namely: the system must be non-linear, it must experience an abrupt excursion far from thermodynamic equilibrium, and it must be subjected to an energy flux (order from chaos).

An artificially generated high energy/high frequency electromagnetic field (such as the fields an HEEMFG can produce) can fulfill all three conditions simultaneously (especially in an accelerated vibration/rotation mode), when strongly interacting with the local vacuum energy state. These interactions are induced by the coupling of hyper-frequency axial rotation (spin) and hyper-frequency vibration (harmonic oscillations/abrupt pulsations) of electrically charged systems (high energy electromagnetic field generators), placed on the outside of the craft in strategic locations.

In this manner, local vacuum polarization, namely the coherence of vacuum fluctuations within the immediate proximity of the craft's surface (outside vacuum boundary) is achieved, allowing for 'smooth sailing' through the negative pressure (repulsive gravity) of the 'void' (the void within the vacuum). It may be stated that the void 'sucks in' the craft.

It is of extreme importance that the craft has the ability to control the accelerated modes of vibration and spin of the electrically charged surfaces, in particular the rapid rates of change of accelerated-decelerated-accelerated vibration and/or accelerated-decelerated-accelerated gyration (axial spin) of the electrified surfaces. In this manner we can delay the onset of relaxation to thermodynamic equilibrium, thus generating a physical mechanism which may induce anomalous effects (such as inertial or gravitational mass reduction). Furthermore, it is possible to enable the Gertsenshtein Effect, namely the production of high frequency gravitational waves by high frequency electromagnetic radiation, in this manner modifying the gravitational fields in close proximity to the craft, resulting in its propulsion.

For the mathematical formalism of inertial (and thus gravitational) mass reduction consider that in a published Physical Review Letter (December 1989), Hayasaka and Takeuchi report the anomalous weight reduction of gyroscopes for right rotations only. At the time, the authors could not elucidate the physics behind these anomalous results. Several null result experiments followed (a recent one as well) which declared the Hayasaka et al. results null and void, or at least questionable—however all these experiments were flawed in their ability to entirely duplicate the Hayasaka et al. experimental procedure and set-up (especially the high vacuum chamber the test section was mounted inside).

Closer attention to the non-zero intercept of the Hayasaka et al. expression relating the gyro's weight diminution with respect to its mass, its angular rotational frequency and its effective rotor radius, yields the possibility of a local quantum vacuum effect, namely a negative pressure (repulsive gravity) condition being present. This is due to the non-zero intercept being of the same order of magnitude with the Fokker-Planck electron-proton thermal equilibration rate ($f_{ep}$), given an approximate Hydrogen atom number density of 40 atoms/m³, commensurate with the local quantum vacuum state.

Consider the Hayasaka et al. expression for gyro-weight reduction, written in SI units as:

$$\Delta W_R(\omega) = -2 \times 10^{-10} \, M \, r_{eq} \, \omega \text{ kg m s}^{-2} \quad \text{(Equation 5)},$$

where $\Delta W_R$ is the reduction in weight, M is the mass of the rotor (in kg), $\omega$ is the angular frequency of rotation (in rad/s), and $r_{eq}$ is the equivalent gyro-radius (in m).

From this relationship we see that the units of the non-zero intercept ($2 \times 10^{-10}$) are (1/s). This non-zero intercept is endemic of the physics of gyro-rotational acceleration, in particular, the physical mechanism of abrupt excursion far from thermodynamic equilibrium.

We can further hypothesize that if the gyro-rotor was to vibrate uniformly (instead of rotating), and its vibration (harmonic oscillation) was to accelerate in frequency (thus inducing a state of abrupt departure far from thermodynamic equilibrium), it is possible that the resulting physics would be similar to that describing the rotational acceleration, thus we may write (using a simple dimensional analysis):

$$\Delta W_R(v) = -f_{ep} \, M \, A_v \, v \text{ kg m s}^{-2} \quad \text{(Equation 6)},$$

where $f_{ep}$ is the Fokker-Planck electron-proton thermal equilibration rate, $A_v$ is the vibration amplitude and v is frequency of vibration (in 1/s).

SUMMARY

The present invention is directed to a craft using an inertial mass reduction device. The craft includes an inner resonant cavity wall, an outer resonant cavity, and microwave emitters. The outer resonant cavity wall and the inner resonant cavity wall form a resonant cavity. The microwave emitters create high frequency electromagnetic waves throughout the resonant cavity causing the outer resonant cavity wall to vibrate in an accelerated mode and create a local polarized vacuum outside the outer resonant cavity wall.

It is a feature of the present invention to provide a craft, using an inertial mass reduction device, that can travel at extreme speeds.

DRAWINGS

Figure 2:
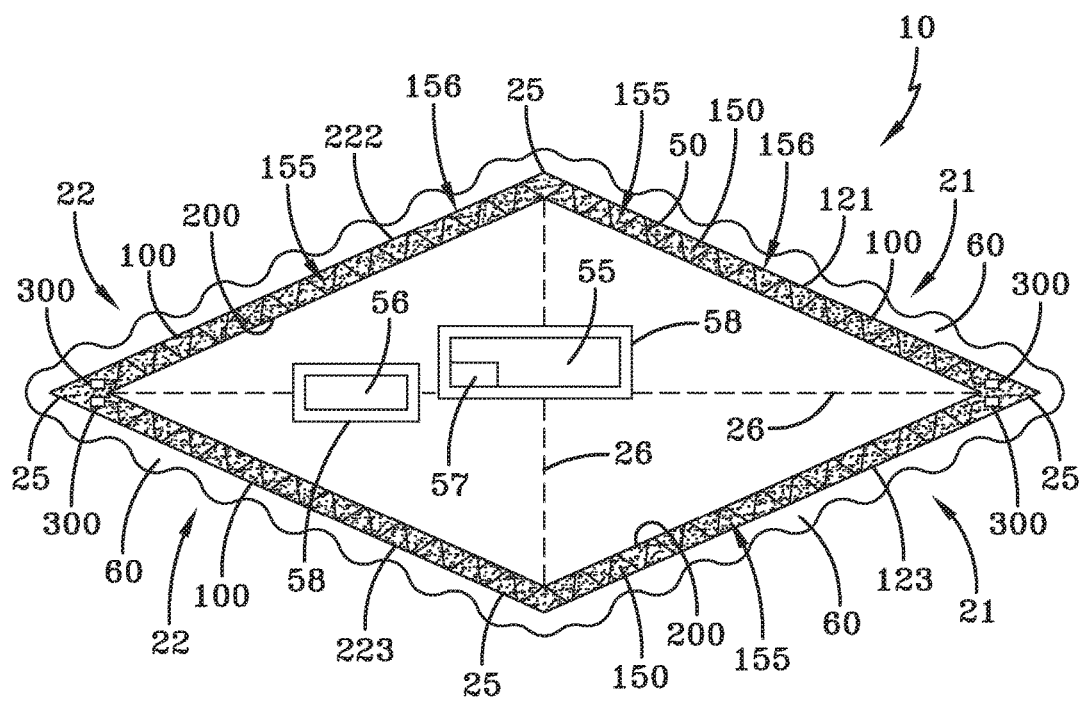

These and other features, aspects and advantages of the present invention will become better understood with reference to the following description and appended claims, and accompanying drawings wherein:

FIG. 1 is an embodiment of the craft using an inertial mass reduction device; and FIG. 2 is another embodiment of the craft using an inertial mass reduction device.

DESCRIPTION

The preferred embodiments of the present invention are illustrated by way of example below and in FIGS. 1-2. As shown in FIG. 1, the craft 10 using an inertial mass reduction device comprises of an outer resonant cavity wall 100, an inner resonant cavity 200, and microwave emitters 300. The outer resonant cavity wall 100 and the inner resonant cavity wall 200 form a resonant cavity 150. The microwave emitters 300 create high frequency electromagnetic waves 50 throughout the resonant cavity 150 causing the outer resonant cavity wall 100 to vibrate in an accelerated mode and create a local polarized vacuum 60 outside the outer resonant cavity wall 100.

In the description of the present invention, the invention will be discussed in a space, sea, air, or terrestrial environment; however, this invention can be utilized for any type of application that requires use of an inertial mass reduction device or use of a craft.

In the preferred embodiment, the resonant cavity 150 is filled with a noble gas 155. The gas xenon may be used; however, any noble gas 155 or the equivalent can be utilized. The gas is used for the plasma phase transition aspect of symmetry-breaking for amplification of the Prigogine effect. In addition, the resonant cavity 150 may be an annular duct. As shown in FIG. 1, the resonant cavity 150 may also surround a crew compartment 55, a power plant system 56, a cargo bay 57, or any other type of compartment. The crew compartment 55, power plant system 56, cargo bay 57, and the like can be guarded in a Faraday-type cage 58, against all EM radiation effects.

The craft 10, particularly the outer resonant cavity wall 100, may be electrically charged. In addition, the inner resonant cavity wall 200 may be electrically insulated, in order for the inner resonant cavity wall 200 not to vibrate. The craft 10 includes a main body 20 with a leading portion 21 and a trailing portion 22. Additionally, the craft 10 may include a frustum 25 or cone on its leading portion 21 of its main body 20. In one of the embodiments, the frustum 25 is rotatable about its own axis 26 or has the ability to rotate.

The microwave emitter(s) 300 may be an electromagnetic field generator. The preferred electromagnetic generator is the one described in U.S. patent application Ser. No. 14/807,943, entitled "Electromagnetic Field Generator and Method to Generate an Electromagnetic Field," filed on Jul. 24, 2015. The application is herein incorporated by reference, and has the same inventor. However, the microwave emitters 300 may be any type of microwave emitter or radio frequency emitter that is practicable.

As shown in FIGS. 1 and 2, the craft 10 has a plurality of microwave emitters 300. The microwave emitters 300 are arranged within the resonant cavity 150, and may be antennas (high radio frequency emitter sources) in the electromagnetic (EM) spectrum range of 300 Megahertz to 300 Gigahertz. The plurality of microwave emitters 300 are arranged within the resonant cavity 150 such that the required electrical charge is present through the resonant cavity 150 in order to cause the outer resonant cavity wall 100 to vibrate in an accelerated mode.

As described, in one of its embodiments, the craft 10 utilizes microwave-induced vibration within a resonant annular cavity (the resonant cavity 150). The manner and effectiveness with which the microwave energy couples with the outer resonant cavity wall 100 is called the cavity Q-factor (the inner resonant cavity wail 200 is electrically insulated and does not vibrate). This parameter can be written as the (energy stored/energy lost) ratio and is in the range of $10^4$ to $10^9$ (and beyond), depending on whether ordinary metal (Aluminum or Copper at room temperature) or cryogenically cooled superconducting material (Yttrium Barium Copper Oxide or Niobium) is used for the outer resonant cavity wall 100 and outside mold line skin of the craft. One must realize that the high energy/high frequency electromagnetic field generator responsible for the inertial mass diminution effect would generate a repulsive EM energy field while in earth's atmosphere, thereby repelling air molecules in its path of ascent/flight. Consequently, once in orbital space, by local vacuum polarization (quantum field fluctuations' modification/coherence), a repulsive gravity effect (recall the negative pressure of the polarized vacuum) would permit swift movement of the craft 10 (which can be, but without limitation, a cone or lenticular triangle/delta wing configuration).

It is possible to envision a hybrid aerospace/undersea craft (HAUC), which due to the physical mechanisms enabled with the inertial mass reduction device, can function as a submersible craft capable of extreme underwater speeds (lack of water-skin friction) and enhanced stealth capabilities (non-linear scattering of RF and sonar signals). This hybrid craft would move with great ease through the air/space/water mediums, by being enclosed in a vacuum plasma bubble/sheath, due to the coupled effects of EM field-induced air/water particles repulsion and vacuum energy polarization.

As shown in FIG. 2, in another embodiment of the invention, the trailing portion 22 of the craft 10 is a mirror age of the leading portion 21. This includes all working components internal to the craft. As shown in FIG. 2, the leading portion 21 includes a top leading edge portion 121 and a bottom leading edge portion 123, while the trailing portion 22 includes top trailing edge portion 222 and a bottom trailing edge portion 223. Both the trailing portions 22 and leading portions 21 include an outer resonant cavity wall 100 and an inner resonant cavity wall 200 forming a resonant cavity 150, such the resonant cavity 150 shrouds, envelopes, or encapsulates the craft 10. The outer resonant cavity wall 100, inner resonant cavity wall 200, and resonant cavity 150 that completely surrounds the craft 10 can be referred to as a resonant cavity shroud 156. The microwave emitters 300 create high frequency electromagnetic waves throughout the entire resonant cavity shroud 156 causing the outer resonant cavity wall 100 (or a portion of the outer resonant cavity wall 100) to vibrate and create a local polarized vacuum 60 outside the outer resonant cavity wall 100.

In operation, in the preferred embodiment, the craft 10 may be powered to move in different directions by causing different sections of the resonant cavity shroud 156 to vibrate. For instance, to move upwards the top portion 156 (top leading edge portion 121 and top trailing edge portion 222) of the resonant cavity shroud 156 is vibrated, thereby, causing the polarized vacuum field 60 to move the craft upward.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A craft using an inertial mass reduction device comprising:
   an inner resonant cavity wall;
   an outer resonant cavity wall, the inner resonant cavity wall and the outer resonant cavity wall forming a resonant cavity; and,
   microwave emitters such that the microwave emitters create high frequency electromagnetic waves throughout the resonant cavity causing the outer resonant cavity wall to vibrate in an accelerated mode and create a local polarized vacuum outside the outer resonant cavity wall.

2. The craft of claim 1, wherein the resonant cavity is filled with a noble gas.

3. The craft of claim 1, wherein the outer resonant cavity wall is electrically charged.

4. The craft of claim 1, wherein the resonant cavity is axially rotated in an accelerated mode.

* * * * *